UNITED STATES PATENT OFFICE 2,304,917

POLYMERIZATION OF VINYL COMPOUNDS WITH ACETYLENE ALCOHOLS

Heinrich Hopff and Curt W. Rautenstrauch, Ludwigshafen-on-the-Rhine, Germany, assignors, by mesne assignments, to General Aniline & Film Corporation, New York, N. Y., a corporation of Delaware No Drawing. Application August 22, 1939, Serial No. 291,334. In Germany August 30, 1938

4 Claims. (Cl. 260—80)

The present invention relates to an improved process of polymerization of vinyl compounds.

We have found that in the emulsion polymerization of vinyl compounds and asymmetric dichlorethylene a marked acceleration can be obtained by carrying out the polymerization in the presence of acetylene alcohols, as for example propargyl alcohol, 1.4-butine-diol or methyl butinol, preferably in amounts of from 0.5 to 10 per cent by weight calculated with regard to the weight of the substances to be polymerized. But smaller or larger amounts can also be employed. Among suitable compounds of which the polymerization is especially accelerated by the said acetylene alcohols or can be carried out at considerably lower temperatures than are otherwise usual, there may be mentioned for example vinyl esters of organic acids, vinyl chloride, styrene, butadiene, its homologues and chlorine substitution products, vinyl ketones, vinyl carbazole, asymmetric dichlorethylene, divinylbenzene and mixtures of the said compounds either with each other or with other unsaturated organic compounds capable of polymerization under the same conditions.

The polymerization is carried out in the manner usual for emulsion polymerizations, advantageously in the presence of substances giving off oxygen, in particular organic or inorganic peroxides, persulphates or per-acids. Suitable emulsifying agents, as already described in the said specification, are those on the basis of higher fatty acids, as for example alkali salts or also taurides of higher molecular weight fatty acids, and also sulphuric acid esters of higher molecular weight fatty alcohols, sulphonated fatty acid amides, addition compounds of several molecules of ethylene oxide and long-chained organic compounds containing hydroxyl or amino groups, alkylated naphthalene sulphonic acids, and reaction products of one or more molecules of long-chained aliphatic amines with beta.beta'-dichlordiethyl ether.

The following example will further illustrate how the said invention may be carried out in practice but the invention is not restricted to this example. The parts are by weight.

*Example*

675 parts of fumaric acid diethyl ester and 265 parts of butadiene are emulsified in a solution of 40 parts of a reaction product of 1 molecule of beta.beta'-dichlordiethyl ether with 2 molecules of a high molecular weight amine obtained from paraffin wax oxidation products by way of the fatty acids, fatty acid nitriles and reduction of the latter in 1000 parts of water. To the emulsion there are added 0.5 part of potassium persulphate, 4 parts of 30 per cent hydrogen peroxide and 50 parts of 1.4-butine-diol and the whole kept at 40° C. while stirring vigorously. Polymerization thus sets in which is completed after 4 hours, whereas without the addition of the butine-diol only from about 60 to 65 per cent are polymerized after about 15 hours. When using smaller amounts of 1.4-butine-diol, the time of polymerization is increased; thus for complete polymerization of the mixture when adding 2.5 per cent of 1.4-butine-diol from 5.5 to 6 hours are required, when adding 1 per cent 8 hours are required, whereas without any addition from 24 to 30 hours are necessary.

What we claim is:

1. In the emulsion polymerization of unsaturated compounds selected from the class consisting of vinyl compounds and asymmetric dichlorethylene, the improvement which comprises carrying out the polymerization in the presence of an acetylene alcohol selected from the class consisting of propargyl alcohol, 1.4-butine-diol and methyl butinol as a polymerization accelerator.

2. The process as defined in claim 1 wherein the acetylene alcohol is 1.4-butine-diol.

3. The process as defined in claim 1 wherein the polymerization is effected in the presence of a substance giving off oxygen and selected from the class consisting of peroxides and persulfates.

4. The process as defined in claim 1 wherein the acetylene alcohol is employed in an amount of from .5 to 10 per cent by weight of the unsaturated compound.

HEINRICH HOPFF.
CURT W. RAUTENSTRAUCH.